United States Patent
Chen

(10) Patent No.: US 6,408,990 B1
(45) Date of Patent: Jun. 25, 2002

(54) SETTLING DEVICE FOR STOPPING MOVEMENT OF BABY CAR BY INHIBITING ROTATION OF WHEELS

(75) Inventor: Chin-Ching Chen, Hsin-Chu Industrial Park (TW)

(73) Assignee: Kingstar Baby Carriage Co., Ltd. (TW)

( * ) Notice: Subject to any disclaimer, the term of this patent is extended or adjusted under 35 U.S.C. 154(b) by 0 days.

(21) Appl. No.: 09/739,669

(22) Filed: Dec. 20, 2000

(51) Int. Cl.[7] ................................................ B62B 9/08
(52) U.S. Cl. ........................... 188/20; 188/2 F; 188/69; 188/31
(58) Field of Search ............................... 188/31, 20, 19, 188/2 F, 60, 69, 265, 72.9; 280/650, 647, 47.38; 74/822, 813 L

(56) References Cited

U.S. PATENT DOCUMENTS

| | | | | |
|---|---|---|---|---|
| 2,667,945 A | * | 2/1954 | Caldeira | 188/2 F |
| 2,988,175 A | * | 6/1961 | West | 188/31 |
| 4,116,464 A | * | 9/1978 | Haley | 280/647 |
| 4,997,065 A | * | 3/1991 | Bigo | 188/31 |
| 5,370,408 A | * | 12/1994 | Eagan | 188/20 |
| 5,373,917 A | * | 12/1994 | Kamman | 188/19 |
| 5,460,399 A | * | 10/1995 | Baechler et al. | 188/20 |

* cited by examiner

Primary Examiner—Paul N. Dickson
Assistant Examiner—Mariano Sy
(74) Attorney, Agent, or Firm—Lowe Hauptman Gilman & Berner, LLP

(57) ABSTRACT

A settling device of a baby car for stopping the movement of the baby car by inhibiting the rotation of the car wheels is disclosed. The settling device of a baby car includes a button portion for providing therethrough a user's operation, and a pivot portion located between the button portion and a wheel of the baby car, and including a pin which is adjacent to the wheel and can be pushed into a vacancy between spokes of the wheel in response to the user's operation. By this way, the wheels are stranded from rotating, and the baby car is settled down.

15 Claims, 2 Drawing Sheets

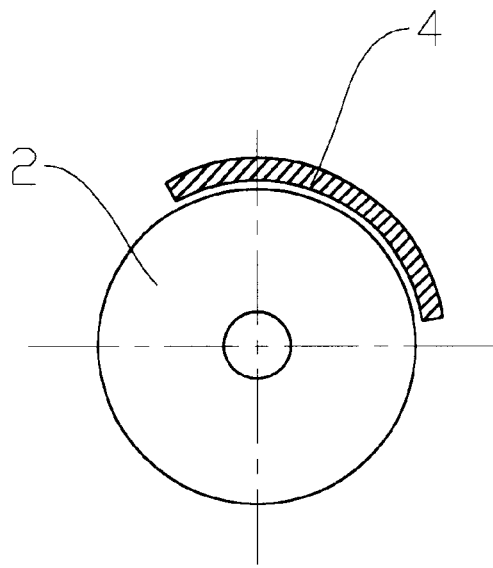
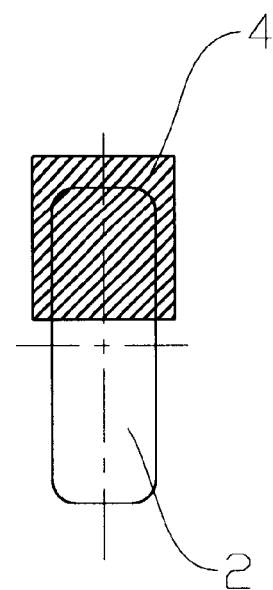
Fig. 1A
(Prior Art)
Fig. 1B
(Prior Art)
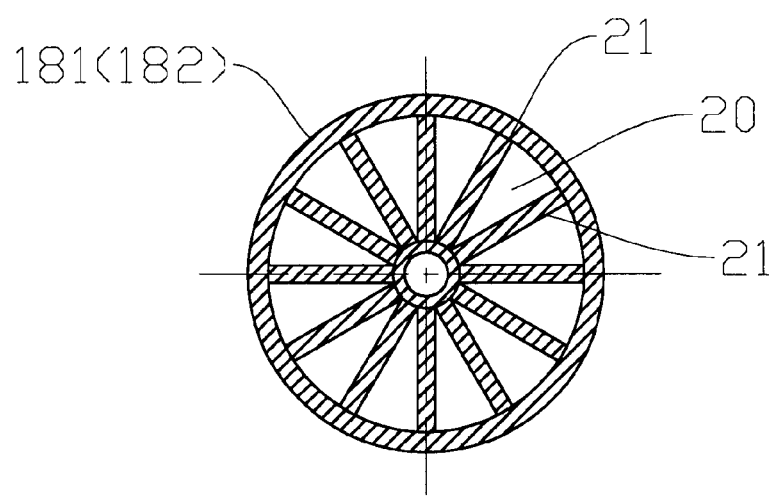
Fig. 3

SETTLING DEVICE FOR STOPPING MOVEMENT OF BABY CAR BY INHIBITING ROTATION OF WHEELS

FIELD OF THE INVENTION:

The present invention relates to a settling device, and more particularly to a settling device of a baby car for stopping the movement of the baby car by inhibiting the rotation of the car wheels.

BACKGROUND OF THE INVENTION

With the rapid development in an industrialized society and more and more attention paid to the safety of babies, standards of safety requirements on baby-related products are stipulated in many countries all over the world. For example, symbols of CNS in Taiwan, UL in US and CE in European Union are marked on qualified products to facilitate users to identify them. Baby cars are also required to pass the above-mentioned tests to be used in safety.

One kind of baby cars is designed for helping a small baby to practice walking, so called as a baby walker. A baby walker includes plural wheels under a seat with balance. A baby in the seat which supports his weight steps against the ground to move with the aid of the wheels. Due to the free movement of the baby by way of the car, the baby is subject to danger in absence of watching care. For example, if the baby walker is moved through an uneven topography or stairs, it may result in turnover, and the baby may get hurt. Therefore, a settling device is needed to stop the car when the watching person cannot keep his eyes on the baby all the time.

Currently, a commercialized baby walker includes a settling device operated by a frictional force, as shown in FIG. 1. The settling device includes a friction mask 4 over a wheel 2. By keeping the friction mask 4 in contact with the wheel 2, the frictional force there between makes the rotation of the wheel 2 difficult so as to stop the car. The use of the frictional force, however, cannot guarantee the motionless state of the car because a larger force is still possible to rotate the wheel to some extent. In addition, the frictional force may decrease with the using time so as to further lower the settling effect.

SUMMARY OF THE INVENTION

Therefore, an object of the present invention is to provide a settling device of a baby car to efficiently inhibit the rotation of the car wheels.

According to a first aspect of the present invention, a settling device for stopping a baby car from moving by inhibiting the rotation of wheels is provided. The settling device includes a button portion, a button support portion and a pivot portion. The button support portion is arranged between two opposite ends of the button portion for supporting the button portion, and allowing one of the two opposite ends to be elevated when the other end is pressed down. The pivot portion includes a first linking rod connected to a first end of the button portion via a first connecting point, and performing a first horizontal shift when the first end is pressed down; and a first arm connected to the first linking rod via a second connecting point, and performing a second horizontal shift to enter one of the wheels in response to the first horizontal shift of the first linking rod so as to inhibit the wheel to rotate. For example, the first arm has an end -portion thereof enter a vacancy between spokes of the wheel to stop the wheel from rotating.

Preferably, the button portion are convex at the two opposite ends and concave in the middle so that a user is easy to exert a pressing force on the button portion.

Preferably, the pivot portion further includes a second linking rod connected to the first end of the button portion via the first connecting point, and performing a third horizontal shift when the first end is pressed down; and a second arm connected to the second linking rod via a third connecting point, and performing a fourth horizontal shift to enter another one of the wheels in response to the third horizontal shift of the second linking rod so as to inhibit the another wheel to rotate.

In an embodiment, the pivot portion further includes a third linking rod connected to the first arm and the first linking rod via the second connecting point; and a fourth linking rod connected to the second arm and the second linking rod via the third connecting point, and to the third linking rod via a fourth connecting point which is fixed at a position. The first, the second, the third and the fourth linking rods constitute a quadrilateral, e.g. a rhombus, via the connection of the first, the second, the third and the fourth connecting points with the first and the second arms horizontally extending from two opposite end points of the quadrilateral.

According to a second aspect of the present invention, a settling device for stopping a baby car from moving by inhibiting the rotation of wheels includes a button portion for providing thereon a pressing force; a button support portion arranged between two ends of the button portion for supporting the button portion, and allowing the two ends of the button portion to perform a seesawing motion in response to the pressing force; and a pivot portion located between a first and a second wheels for controlling the rotation of the first and the second wheels according to the seesawing motion of the button portion. The pivot portion includes a first linking rod connected to a first one of the two ends of the button portion via a first connecting point, and performing a vertical shift in response to the pressing force exerted on the button portion; a second linking rod connected to the first linking rod via a second connecting point, and performing a first vertical partial shift and a first horizontal partial shift in response to the vertical shift of the first linking rod; a third linking rod connected to the first linking rod via the second connecting point, and performing a second vertical partial shift and a second horizontal partial shift in response to the vertical shift of the first linking rod; a first arm connected to the second linking rod via a third connecting point, and performing a first horizontal shift in response to the first horizontal .partial shift of the second linking rod; a second arm connected to the third linking rod via a fourth connecting point, and performing a second horizontal shift in response to the second horizontal partial shift of the third linking rod.

Preferably, the pivot portion further includes a fourth linking rod connected to the second linking rod and the first arm via the third connecting point, and a fifth linking rod connected to the third linking rod and the second arm via the fourth connecting point, and the fourth and the fifth linking rods are connected with each other via a fifth connecting point which is fixed at a position, so that the first, second, third and fourth linking rods constitute an original quadrilateral.

For the situation that the baby car is disallowed to be moved, the pressing force is exerted on the first end of the button portion, and the vertical shift of the first linking rod, the first vertical partial shift of the second linking rod, and the second vertical partial shift of the third linking rod are in a downward direction. At this moment, the first horizontal partial shift of the second linking rod and the first horizontal shift of the first arm are in a direction toward the first wheel so as to have an end portion of the first arm enter a vacancy between spokes of the first wheel to stop the first wheel from rotating, and the second horizontal partial shift of the third linking rod and the second horizontal shift of the second arm are in a direction toward the second wheel so as to have an end portion of the second arm enter a vacancy between spokes of the second wheel to stop the second wheel from rotating. In this case, the first horizontal shift of the first arm and the second horizontal shift of the second arm are in back-to-back opposite directions so that the original quadrilateral becomes a horizontally extended rhombus.

For the situation that the baby car is allowed to be moved again, the pressing force is exerted on a second end of the button portion opposite to the first end, and the vertical shift of the first linking rod, the first vertical partial shift of the second linking rod, and the second vertical partial shift of the third linking rod are in an upward direction. Correspondingly, the first horizontal partial shift of the second linking rod and the first horizontal shift of the first arm are in a direction away from the first wheel so as to retract the end portion of the first arm from the vacancy between spokes of the first wheel, and the second horizontal partial shift of the third linking rod and the second horizontal shift of the second arm are in a direction away from the second wheel so as to retract the end portion of the second arm from the vacancy between spokes of the second wheel, thereby allowing the first and the second wheels to rotate. In this case, the first horizontal shift of the first arm and the second horizontal shift of the second arm are in face-to-face opposite directions so as to recover the original quadrilateral.

According to a third aspect of the present invention, a settling device of a baby car includes a button portion for providing therethrough a user's operation; and a pivot portion located between the button portion and a wheel of the baby car, and including a pin which is adjacent to the wheel and can be pushed into a vacancy in the wheel in response to the user's operation to stop the wheel from rotating.

BRIEF DESCRIPTION OF THE DRAWINGS

The present invention may best be understood through the following description with reference to the accompanying drawings, in which:

FIG. 1A is a side view of a conventional settling device which stops a car wheel from rotating by way of a frictional force;

FIG. 1B is a front view of the conventional settling device of FIG. 1A;

FIG. 3 is a side view of a wheel of a baby car, showing a vacancy provided for a settling device according to the present invention to be inserted therein.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 2A:
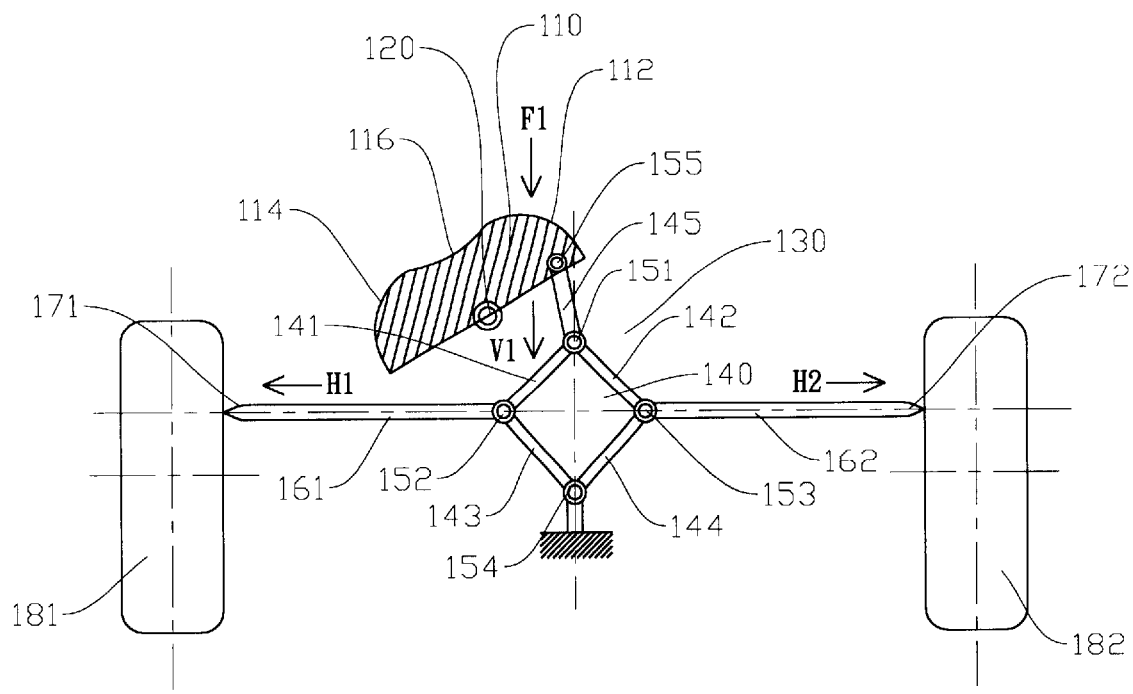
FIG. 2A is a schematic diagram showing a preferred embodiment of a settling device according to the present invention wherein the baby car is in a movement-allowed condition.
Figure 2B:
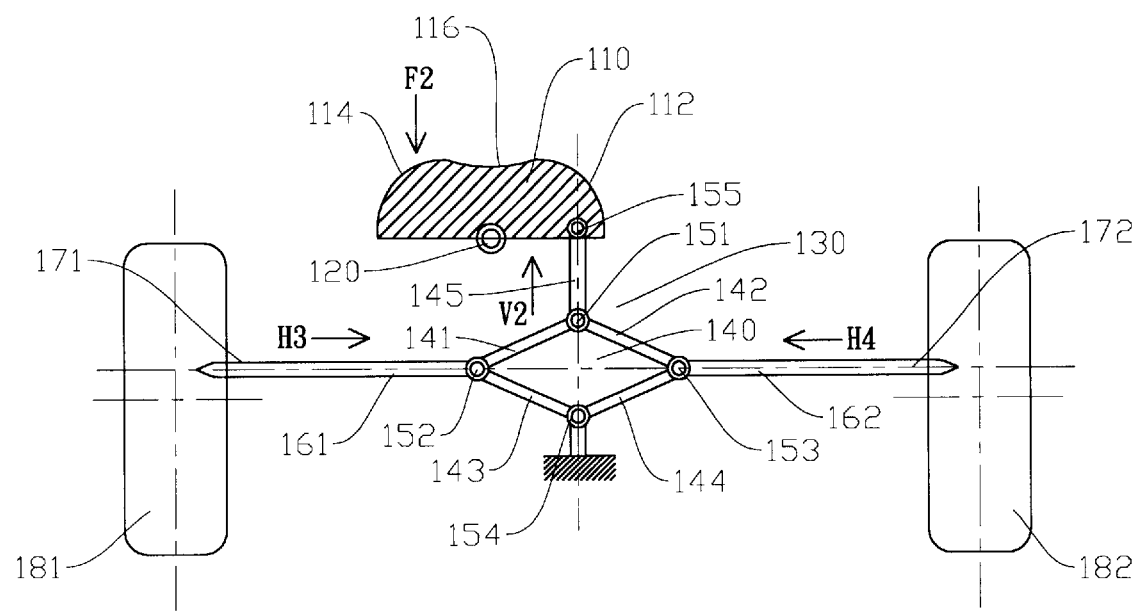
FIG. 2B is a schematic diagram showing the settling device of FIG. 2A wherein the baby car is in a movement-forbidden condition.

Please refer to FIGS. 2A and 2B which are schematic diagrams showing a preferred embodiment of a settling device of a baby car according to the present invention before use and in use, respectively. The settling device includes a button portion 110, a button support portion 120, and a pivot portion 130. The button portion 110 includes two convex parts at two opposite ends 112 and 114, respectively, and one concave part in the middle 116. Whether the baby car can be moved or not is determined by a pressing force exerted on one of the convex parts. For example, if the baby car is to be stopped from moving, the user exerts a pressing force F1 on the convex part at the end 112, and the button portion 110 will change from FIG. 2A to FIG. 2B. When the baby car is to be moved, the user exerts a pressing force F2 on the convex part at the end 114, and the button portion 110 will change from FIG. 2B to FIG. 2A.

The button support portion 120 is arranged for supporting the button portion 110 in position. In addition, the button support portion 120 is mounted between the two ends 112 and 114 of the button portion 110, and functions as a fulcrum to allow the button portion to perform a levering or seesawing motion in response to the pressing force F1 or F2.

The pivot portion includes a flexible quadrilateral part 140 which consists of four linking rods 141, 142, 143 and 144 interconnected via connecting points 151, 152, 153 and 154, as shown in FIG. 2A or 2B. While the connecting points 151, 152 and 153 are movable, the connecting point 154 is fixed at a position. The quadrilateral part 140 is connected to the end 112 of the button portion 110 via a linking rod 145 and two connecting points 151 and 155. From two opposite end points of the quadrilateral part 140, i.e. the connecting points 152 and 153, two arms 161 and 162 extend horizontally. At the end portion of each of the arms 161 and 162, a pin 171 or 172 is mounted. The pins 171 and 172 are adjacent to respective wheels 181 and 182 of the baby car to be stopped.

When the pressing force F1 is exerted, the linking rod 145 performs a vertical shift V1 in a downward direction. Consequently, the quadrilateral 140 of a shape of FIG. 2A is pressed and horizontally stretched to become a shape of FIG. 2B. Therefore, each of the linking rods 141, 142, 143 and 144 performs a slant shift divided as a partial horizontal shift and a partial vertical shift. The partial horizontal shift H1 of the linking rods 141 and 143 transmits the arm 161 to move horizontally toward the wheel 181 so that the pin 171 enters a vacancy 20 between spokes 21 of the wheel 181 (FIG. 3). Likewise, the partial horizontal shift H2 of the linking rods 142 and 144 transmits the arm 162 to move horizontally toward the wheel 182 so that the pin 172 enters a vacancy 20 between spokes 21 of the wheel 182 (FIG. 3). By this way, the wheels 181 and 182 are stranded from rotating, and the baby car is settled down.

For the situation that the baby car is allowed to be moved again, the pressing force F2 is exerted, the linking rod 145 performs a vertical shift V2 in an upward direction. Consequently, the quadrilateral 140 of a shape of FIG. 2B is recovered to a shape of FIG. 2A. Therefore, each of the linking rods 141, 142, 143 and 144 performs an opposite slant shift also divided as a partial horizontal shift and a partial vertical shift. The partial horizontal shift H3 of the linking rods 141 and 143 transmits the arm 161 to move horizontally away from the wheel 181 so that the pin 171 is retracted from the vacancy 20 of the wheel 181. Likewise, the partial horizontal shift H4 of the linking rods 142 and 144 transmits the arm 162 to move horizontally; away. from the wheel 182 so that the pin 172 is retracted from the vacancy 20 of the wheel 182. By this way, the wheels 181 and 182 are released, and the baby car is allowed to be moved.

It is to be noted that the shape of the quadrilateral part 140 in the above-mentioned embodiment is a rhombus. However, the shape is not critical as long as the horizontal movement of the arms can be achieved.

For example, it can be a unequilateral diamond shape or a kite shape. In addition, another shape such as a hexagon can also be used. Further, a non-cyclic linking manner is also possible after slight modification.

To sum up, the purpose of stopping the baby car from moving is achieved by jamming at least ,one sticks into respective car wheels so as to inhibit the rotation of the wheels. As for the movement of the stick(s) into or out of the wheel(s), it is controlled by a user through a button portion. By this way, the operation of the present invention is simple, and the effect lasts long, compared to those of the conventional friction mask.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which arararare to be a with the broadest interpretation so as to encompass all such modifications and similar structures.

What is claimed is:

1. A settling device for stopping a baby car from moving by inhibiting the rotation of wheels, comprising:
   a button portion;
   a button support portion arranged between two opposite ends of said button portion for supporting said button portion, and allowing one of said two opposite ends to be elevated when the other is pressed down;
   a pivot portion, comprising:
      a first linking rod connected to a first end of said button portion via a first connecting point, and performing a first horizontal shift when said first end is pressed down; and
      a first arm connected to said first linking rod via a second connecting point, and performing a second horizontal shift to enter one of said wheels in response to said first horizontal shift of said first linking rod so as to inhibit said wheel to rotate.

2. The settling device according to claim 1 wherein said button portion are convex at said two opposite ends and concave in the middle.

3. The settling device according to claim 1 wherein said pivot portion further includes:
   a second linking rod connected to said first end of said button portion via said first connecting point, and performing a third horizontal shift when said first end is pressed down; and
   a second arm connected to said second linking rod via a third connecting point, and performing a fourth horizontal shift to enter another one of said wheels in response to said third horizontal shift of said second linking rod so as to inhibit said another wheel to rotate.

4. The settling device according to claim 3 wherein said pivot portion further includes:
   a third linking rod connected to said first arm and said first linking rod via said second connecting point; and
   a fourth linking rod connected to said second arm and said second linking rod via said third connecting point, and to said third linking rod via a fourth connecting point which is fixed at a position.

5. The settling device according to claim 4 wherein said first, said second, said third and said fourth linking rods constitute a quadrilateral via the connection of said first, said second, said third and said fourth connecting points with said first and said second arms horizontally extending from two opposite end points of said quadrilateral.

6. The settling device according to claim 5 wherein said quadrilateral is a rhombus.

7. The settling device according to claim 1 wherein said first arm has an end portion thereof enter a vacancy between spokes of said wheel to stop said wheel from rotating.

8. A settling device for stopping a baby car from moving by inhibiting the rotation of wheels, comprising:
   a button portion for providing thereon a pressing force;
   a button support portion arranged between two ends of said button portion for supporting said button portion, and allowing said two ends of said button portion to perform a seesawing motion in response to said pressing force; and
   a pivot portion located between a first and a second wheels for controlling the rotation of said first and said second wheels according to said seesawing motion of said button portion, comprising:
      a first linking rod :connected to a first one of said two ends of said button portion via a first connecting point, and performing a vertical shift in response to said pressing force exerted on said button portion;
      a second linking rod connected to said first linking rod via a second connecting point, and performing a first vertical partial shift and a first horizontal partial shift in response to said vertical shift of said first linking rod;
      a third linking rod connected to said first linking rod via said second connecting point, and performing a second vertical partial shift and a second horizontal partial shift in response to said vertical shift of said first linking rod;
      a first arm connected to said second linking rod via a third connecting point, and performing a first horizontal shift in response to said first horizontal partial shift of said second linking rod; and
      a second arm connected to said third linking rod via a fourth connecting point, and performing a second horizontal shift in response to said second horizontal partial shift of said third linking rod.

9. The settling device according to claim 8 wherein said pivot portion further includes a fourth linking rod connected to said second linking rod and said first arm via said third connecting point, and a fifth linking rod connected to said third linking rod and said second arm via said fourth connecting point, and said fourth and said fifth linking rods are connected with each other via a fifth connecting point which is fixed at a position, so that said first, second, third and fourth linking rods constitute an original quadrilateral.

10. The settling device according to claim 9 wherein said vertical shift of said first linking rod, said first vertical partial shift of said second linking rod, and said second vertical partial shift of said third linking rod are in a downward direction when said pressing force is exerted on said first end of said button portion.

11. The settling device according to claim 10 wherein said first horizontal partial shift of said second linking rod and said first horizontal shift of said first arm are in a direction toward said first wheel so as to have an end portion of said first arm enter a vacancy between spokes of said first wheel to stop said first wheel from rotating, and said second horizontal partial shift of said third linking rod and said second horizontal shift of said second arm are in a direction toward said second wheel so as to have an end portion of said second arm enter a vacancy between spokes of said second wheel to stop said second wheel from rotating.

12. The settling device according to claim 11 wherein said first horizontal shift of said first arm and said second horizontal shift of said second arm are in back-to-back opposite directions so that said original quadrilateral becomes a horizontally extended rhombus.

13. The settling device according to claim 12 wherein said vertical shift of said first linking rod, said first vertical partial shift of said second linking rod, and said second vertical partial shift of said third linking rod are in an upward direction when said pressing force is exerted on a second one of said two ends of said button portion opposite to said first end relative to said button support portion.

14. The settling device according to claim 13 wherein said first horizontal partial shift of said second linking rod and said first horizontal shift of said first arm are in a direction away from said first wheel so as to retract said end portion of said first arm from said vacancy between spokes of said first wheel, and said second horizontal partial shift of said third linking rod and said second horizontal shift of said second arm are in a direction away from said second wheel so as to retract said end portion of said second arm from said vacancy between spokes of said second wheel, thereby allowing said first and said second wheels to rotate.

15. The settling device according to claim 14 wherein said first horizontal shift of said first arm and said second horizontal shift of said second arm are in face-to-face opposite directions so as to recover said original quadrilateral.

* * * * *